Oct. 10, 1939.  W. T. SWINGLE  2,175,978

SELF-ALIGNING CUSHION BEARING

Filed Oct. 20, 1937

Inventor

W. T. Swingle

By Mason, Fenwick & Lawrence

Attorneys

Patented Oct. 10, 1939

2,175,978

UNITED STATES PATENT OFFICE 2,175,978

SELF-ALIGNING CUSHION BEARING

Wayne T. Swingle, Hastings, Nebr.

Application October 20, 1937, Serial No. 170,087

6 Claims. (Cl. 308—26)

This invention relates generally to shaft bearings; and more particularly, self-aligning cushion bearings designed for use in supporting shafts subject to considerable transverse vibrations.

The main object of the invention is to provide a self-aligning cushion bearing which can be very readily assembled and manufactured at low cost, and which is extremely quiet where quietness and shock-absorbing qualities are essential.

Another object of the invention is to provide a shaft bearing of the type referred to with improved means for lubricating the same.

Other objects of the invention will become apparent as the detailed description thereof proceeds.

In the drawing.

Referring to the drawing, in which similar parts are designated by like numerals.

Figure 1:
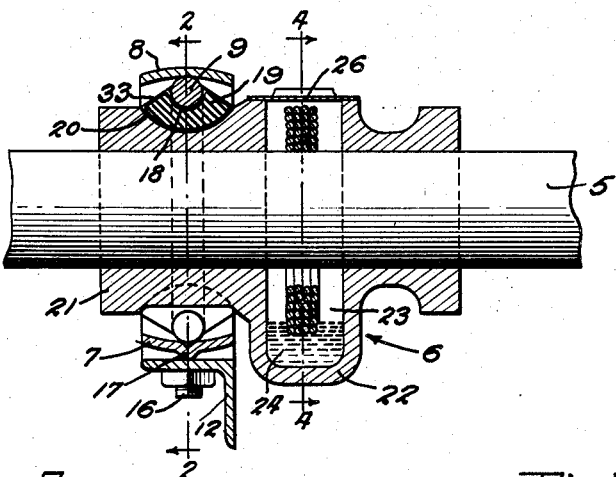
Figure 1 is a vertical longitudinal section through a preferred embodiment of the invention.

The journal bearing for the shaft 5 is designated generally by the reference numeral 6. This bearing comprises a base member 7, and a cooperating inverted U-shaped member 8. The members 7 and 8 form a casing which is spherical in cross section to receive and support a split metallic ring 9. The lower member 7 is provided at its opposite ends with flanges 10 and 11 adapted to seat on the plane face of any suitable support or hanger 12.

The upper member 8 is provide at its lower ends with out-turned flanges 13 and 14 adapted to seat on flanges 10 and 11, respectively. The flanges 10 and 13 and the flanges 11 and 14 are provided with registering apertures to receive the shanks of bolts 15 and 16 for the purpose of securing the casing formed by the members 7 and 8 to the hanger 12.

Figure 2:
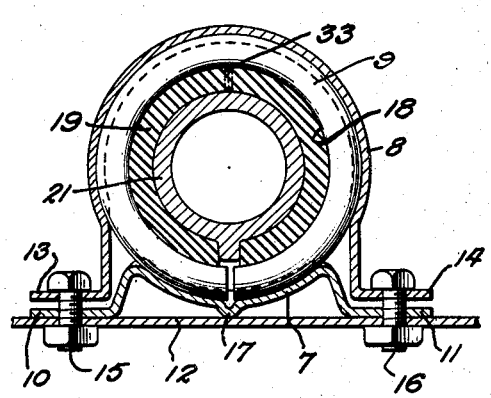
Figure 2 is a vertical transverse section taken on the line 2—2 of Figure 1; with the bearing partly secured to a hanger.
Figure 3:
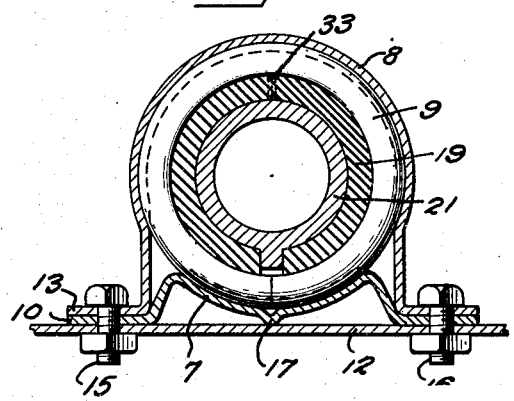
Figure 3 is a vertical transverse section taken on the line 2—2 of Figure 1 and with the bearing secured in operative position.
Figure 4:
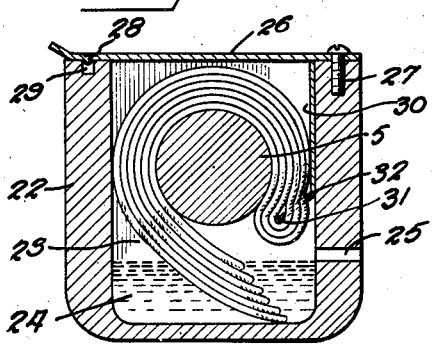
Figure 4 is a vertical transverse section taken on the line 4—4 of Figure 2.

As shown in Figures 2 and 3 of the drawing, the member 7 is provided at its center with a bead 17 having its outer end aligned with the lower surfaces of the flanges 10 and 11, so that the aforesaid bead 17 forms a central support for the lower member 7 of the casing.

The metallic ring 9 is seated in a groove 18 formed in the cylindrical surface of a split cushion 19 made of rubber or some similar resilient material. The cushion 19 is, in turn, seated in an annular groove 20 formed in the bearing block 21 in which the shaft 5 is journaled. The bearing block 21 is extended laterally to form an oil box 22 substantially rectangular in cross section and forming a substantially rectangular reservoir 23 for lubricating oil 24. The casing 22 is provided with an overflow aperture 25 to limit the supply of oil contained for lubricating purposes in the reservoir 23.

The upper end of the box 22 has a cover 26 pivoted thereto by a pivot screw 27. The cover is provided near its free end with a bead 28 adapted to snap into a recess 29 formed in the top edge of the box 22.

To carry the lubricant from the bottom of the reservoir 23 onto the shaft 5, a leaf spring 30 is suitably secured at its upper end to the inner surface of one of the walls of the reservoir 23. The lower end of the leaf spring 30 is bent outwardly from the said wall toward the shaft 5 to form a lateral offset 31 which is provided with an aperture 32 through which a number of strands or cords of packing wool is passed. The two layers of wool formed by passing the cords through the aperture 32 are then drawn upwardly between the shaft 5 and the leaf spring 30 and are extended around the shaft until the free ends of the cords become immersed in the lubricating oil 24.

The spring clip attached to one end of the yarn, not only holds the yarn securely from spinning with the shaft, but permits a less number of strands to be used than would be required if the clip were not used and the bearing were packed with enough yarn to prevent it from turning. This construction effects a saving in yarn and also prevents the oil from "piling up" due to the choking effect between the shaft and reservoir wall in the direction in which the shaft turns.

To carry off static electricity generated by belts and other operating mechanism connected to the shaft, the rubber ring 19 is provided with a "ground strip" 33 to prevent radio interference.

Numerous variations may doubtless be devised by persons skilled in the art without departing from the principles of my invention. I, therefore, desire no limitations to be imposed on my invention, except such as are indicated in the appended claims.

What I claim is:

1. A support, a cylindrical bearing for a shaft, a ring of resilient material mounted on the outer surface of said bearing, a metallic ring of circular cross section mounted on the outer surface of the first ring, and means having a spheroidal surface in contact with the outer surface of the metallic ring for clamping said rings and bearing in assembled relation on said support and to rock about the axis of said shaft, said ring and surface having a common center in the axis of said cylindrical bearing.

2. A support, a cylindrical bearing for a shaft and having a groove around its outer surface, a ring of circular cross section of rubber seated in said groove and having a groove around its outer surface, a split metallic ring seated in the groove of the rubber ring, and means having a spheroidal surface in contact with said split ring for clamping said rings and bearing in assembled relation on said support and to rock about the axis of said shaft, said ring and surface having a common center in the axis of said cylindrical bearing.

3. A support, a cylindrical bearing for a shaft, a metallic ring of circular cross section, a cushion mounting said ring on said bearing, and a journal box having a spheroidal inner surface seating said ring for universal rocking movement about the center of said spheroidal surface, said ring and surface having a common center in the axis of said cylindrical center.

4. A support, a cylindrical bearing for a shaft, a metallic ring of circular cross section, a cushion mounting said ring on said bearing, and a journal box having a spheroidal inner surface seating said ring for universal rocking movement about the center of said spheroidal surface, and means for securing said journal box to a support, said ring and surface having a common center in the axis of said cylindrical center.

5. A bearing adapted to be secured to a support and comprising a cylindrical bearing block, a cushion of resilient material extending around said block, a metallic ring of circular cross section extending around said cushion, and a spheroidal bearing box embracing said ring and forming a support in which said block and rings may rock about the center of said box, said ring and surface having a common center in the axis of said cylindrical center.

6. A support, a cylindrical bearing for a shaft, a ring of resilient material mounted on the outer surface of said bearing, a metallic ring of circular cross section mounted on the outer surface of the first named ring, and means for clamping said ring and bearing in assembled relation onto said support and to rock about the axis of said shaft, said means comprising a base member seated on said support and having a spheroidal surface forming a seat for the metallic ring, and a clamping member cooperating with said base member to clamp the said rings in assembled relation on said block and support, and to rock about the axis of said shaft, said ring and surface having a common center in the axis of said cylindrical bearing.

WAYNE T. SWINGLE.